United States Patent
Takabe

(10) Patent No.: US 12,491,779 B2
(45) Date of Patent: Dec. 9, 2025

(54) POWER FEED CONTROL DEVICE, POWER FEED CONTROL METHOD, AND COMPUTER-READABLE STORAGE MEDIUM

(71) Applicant: TOYOTA JIDOSHA KABUSHIKI KAISHA, Toyota (JP)

(72) Inventor: Jun Takabe, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 211 days.

(21) Appl. No.: 18/342,784

(22) Filed: Jun. 28, 2023

(65) Prior Publication Data
US 2024/0001787 A1    Jan. 4, 2024

(30) Foreign Application Priority Data
Jul. 1, 2022 (JP) .................. 2022-107317

(51) Int. Cl.
*B60L 53/22* (2019.01)
*H02J 50/20* (2016.01)

(52) U.S. Cl.
CPC .............. *B60L 53/22* (2019.02); *H02J 50/20* (2016.02); *B60L 2210/10* (2013.01); *B60L 2240/10* (2013.01); *B60L 2240/42* (2013.01)

(58) Field of Classification Search
CPC .. B60L 53/22; B60L 2210/10; B60L 2240/10; B60L 2240/42; H02J 50/20
USPC ............................................. 701/22
See application file for complete search history.

(56) References Cited

U.S. PATENT DOCUMENTS

| | | | |
|---|---|---|---|
| 6,967,462 B1* | 11/2005 | Landis ................. | H02J 50/80 320/109 |
| 2002/0070692 A1* | 6/2002 | Gonzales ............. | B60L 50/15 318/34 |
| 2008/0309452 A1* | 12/2008 | Zeine ................... | H02J 50/402 340/5.1 |
| 2011/0286374 A1* | 11/2011 | Shin .................... | H02J 50/80 370/311 |

(Continued)

FOREIGN PATENT DOCUMENTS

| | | |
|---|---|---|
| JP | 2017112710 A | 6/2017 |
| JP | 2018182956 A | 11/2018 |
| JP | 2018-198511 A | 12/2018 |

OTHER PUBLICATIONS

Joyal Paul et al., A Noble Method of Charging Electric Vehicle Battery Wirelessly using Microwave Technology, May 2019, GRD Journals, pp. 172-174.*

(Continued)

*Primary Examiner* — Manglesh M Patel
(74) *Attorney, Agent, or Firm* — Dickinson Wright, PLLC

(57) ABSTRACT

A power feed control device includes a transmission processing section configured to convert electrical power supplied from an electric generator provided in a vehicle, into microwaves and transmit them, a reception processing section configured to receive the microwaves that have been transmitted and to reconvert the microwaves into electrical power for accumulation in a battery, a state detection section configured to detect a vehicle state related to drive of the vehicle, and an adjustment section configured to adjust a transmission level of the microwaves transmitted by the transmission processing section based on the vehicle state.

3 Claims, 6 Drawing Sheets

(56) References Cited

U.S. PATENT DOCUMENTS

| | | | | |
|---|---|---|---|---|
| 2012/0206098 A1* | 8/2012 | Kim | ........................ | B60L 53/39 |
| | | | | 320/108 |
| 2012/0274272 A1* | 11/2012 | Hinojosa, Jr. | ........... | H02J 50/20 |
| | | | | 320/108 |
| 2013/0154553 A1* | 6/2013 | Steele | .................... | B60M 7/003 |
| | | | | 320/108 |
| 2015/0149221 A1* | 5/2015 | Tremblay | .............. | B60L 53/305 |
| | | | | 320/109 |
| 2016/0248265 A1* | 8/2016 | Oo | ........................ | H02J 50/502 |
| 2018/0342905 A1 | 11/2018 | Fukaya et al. | | |
| 2019/0118659 A1* | 4/2019 | Gou | ........................ | H02J 50/10 |
| 2023/0268777 A1* | 8/2023 | Henry | .................... | H02J 50/20 |
| | | | | 320/109 |

OTHER PUBLICATIONS

Sazzad Hossain et al., Charging Electric Vehicles via Microwave Energy Transmission and Analysis of Advanced Energy Storage System, 2013, IEEE, pp. 1-6 (pdf).*

Naoki Shinohara et al., Wireless Charging for Electric Vehicle with Microwaves, Dec. 2013, IEEE Explore, pp. 1-4 (pdf).*

Muhammad Amjad et al., Wireless charging systems for electric vehicles, Jul. 8, 2022, Elsevier.com, pp. 1-21 (pdf).*

Ibtihal et al., Study of the Feasibility of Using Microwave Power Transfer for Dynamic Wireless Electric Vehicle Charging, 2020, IEEE, pp. 365-370.*

* cited by examiner

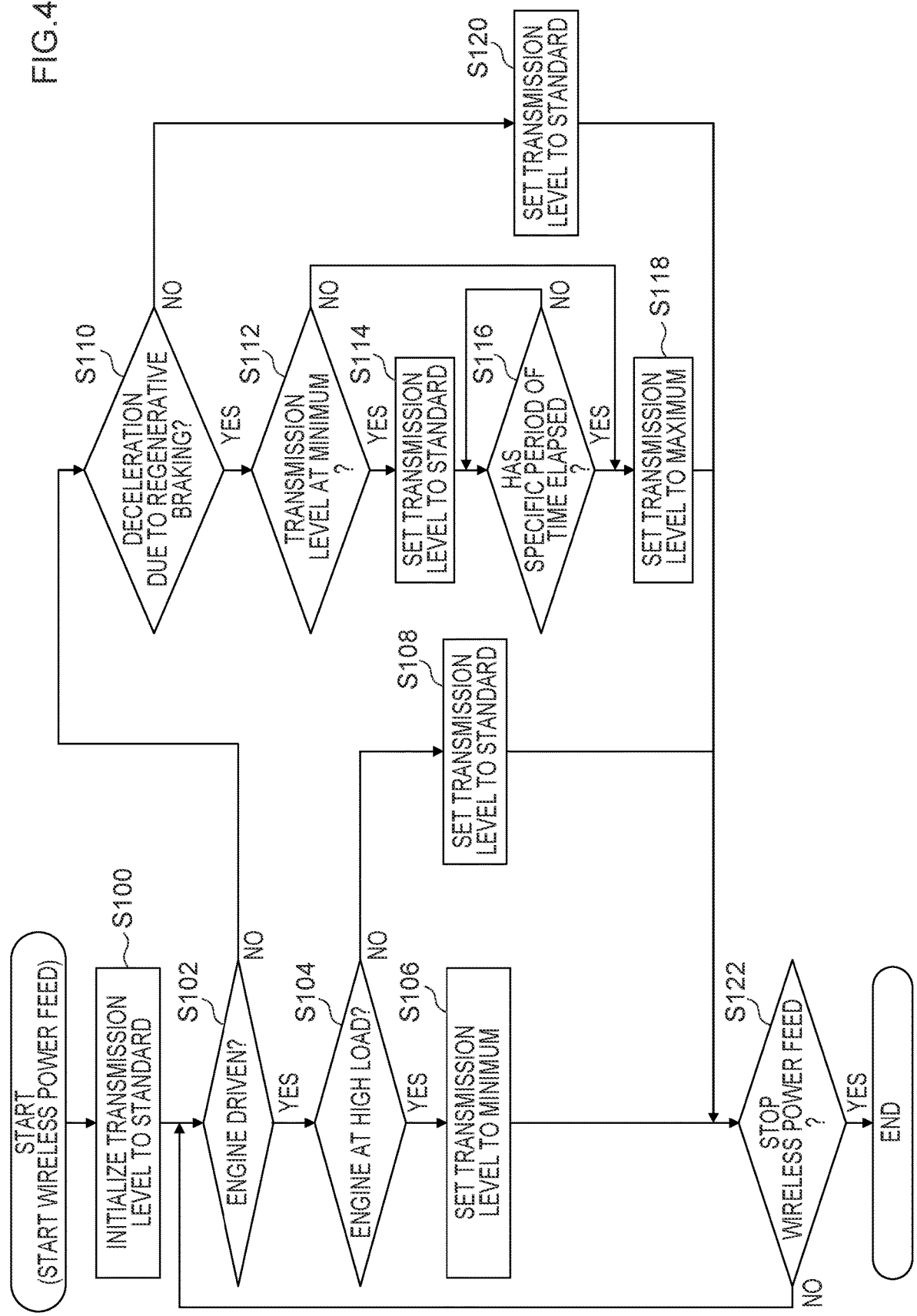

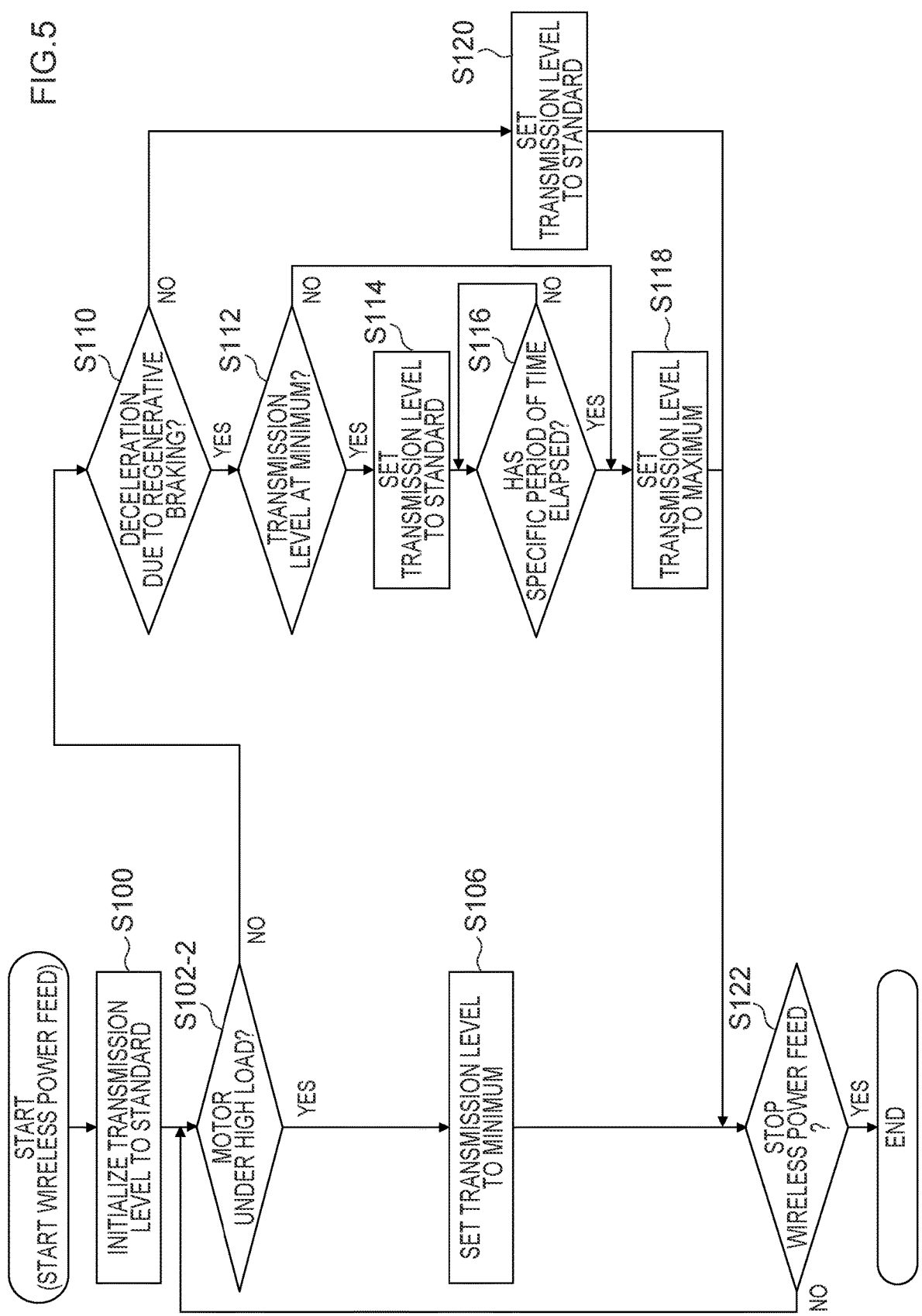

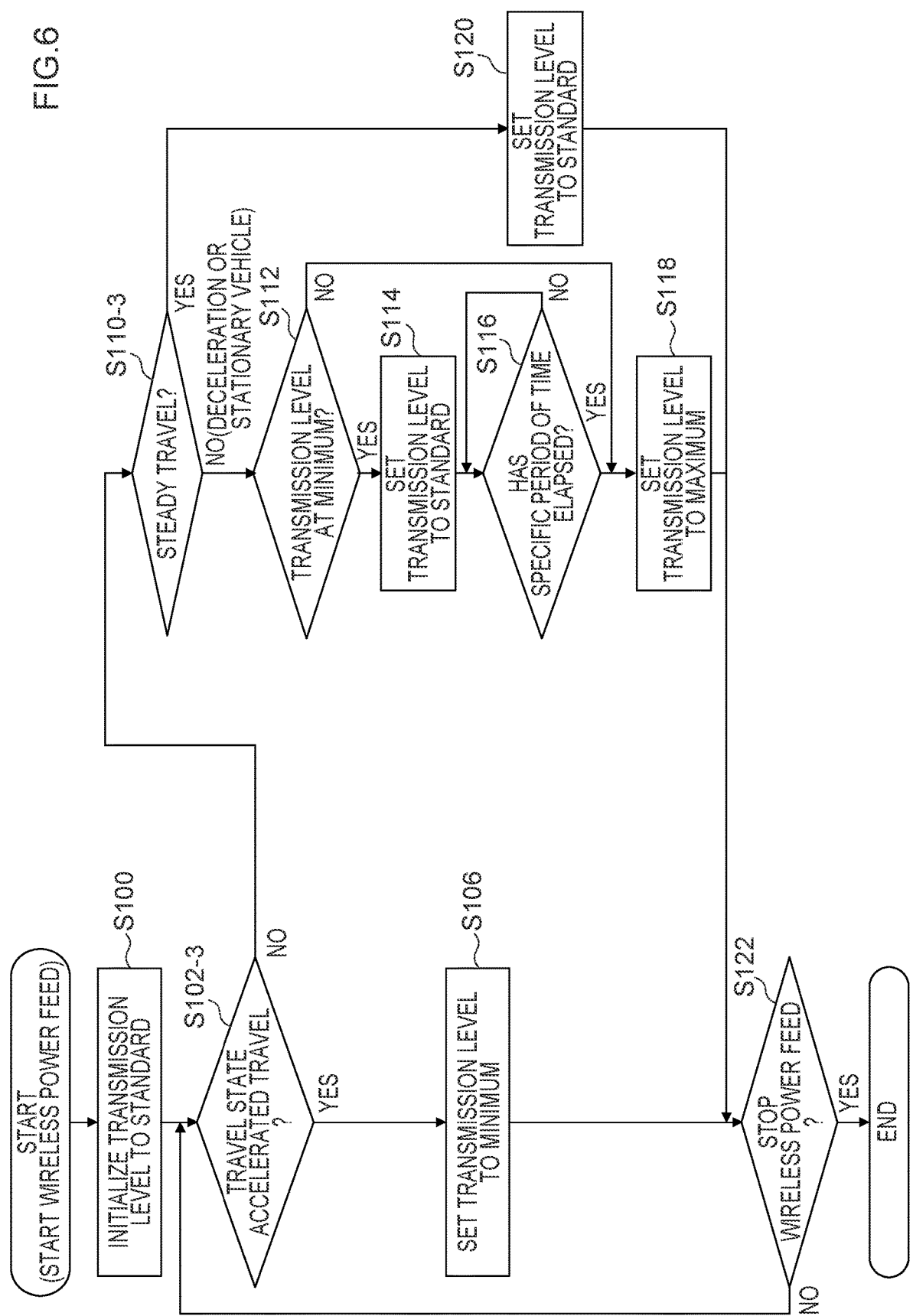

POWER FEED CONTROL DEVICE, POWER FEED CONTROL METHOD, AND COMPUTER-READABLE STORAGE MEDIUM

CROSS-REFERENCE TO RELATED APPLICATION

This application is based on and claims priority under 35 USC 119 from Japanese Patent Application, No. 2022-107317 filed on Jul. 1, 2022, the disclosure of which is incorporated by reference herein in its entirely.

BACKGROUND

Technical Field

The present disclosure relates to a power feed control device, a power feed control method, and a computer-readable storage medium.

Related Art

There is technology for wireless power feeding of power to plural power receiver devices. Technology disclosed in Patent Document 1 (Japanese Patent Application Laid-Open (JP-A) No. 2018-198511 is related to a power feed device that raises the efficiency per unit time of power feed at a power receiver device in cases in which power feed is performed to plural power receiver devices. In such technology a direction of a power receiver device is detected by a signal, and a power feed of electrical power is output.

SUMMARY

However, related technology does not consider fuel economy (electricity cost) of a vehicle during wireless power feeding. A vehicle is only able to employ a limited electrical power, and there is a possibility of an effect on the travel and fuel economy of the vehicle depending on usage of wireless power feeding. For example in cases in which wireless power feeding is executed, accompanying electrical power use when using an electric generator there is also an effect of accelerating fuel and electrical power consumption used for travel, with this leading to a negative effect on fuel economy as the amount of power generated is increased. Operating the electric generator at a time of high load on a power unit, such as an engine or drive motor, has a negative effect on fuel economy. Note that fuel economy includes not only fuel consumption, but also includes a wider definition of electricity cost for electric power consumption.

An object of the present disclosure is to provide a power feed control device, a power feed control method, and a power feed control program capable of optimizing efficiency of fuel economy of a vehicle and performing wireless power feed to an auxiliary device.

A power feed control device of a first aspect includes a transmission processing section, a reception processing section, a state detection section, and an adjustment section. The transmission processing section is configured to convert electrical power supplied from an electric generator provided in a vehicle, into microwaves and transmit them. The reception processing section is configured to receive the microwaves that have been transmitted, and to reconvert the microwaves into electrical power for accumulation in a battery. The state detection section is configured to detect a vehicle state related to drive of the vehicle. The adjustment section is configured to adjust a transmission level of the microwaves transmitted by the transmission processing section based on the vehicle state.

In the power feed control device of the first aspect, the transmission level of microwaves for transmission is adjusted based on the vehicle state. Wireless power feed to an auxiliary device can accordingly be performed while optimizing efficiency of fuel economy of a vehicle.

A power feed control device of a second aspect is the power feed control device of the first aspect, wherein the state detection section detects a load state of a power unit as the vehicle state, and the adjustment section sets the transmission level lower than a standard level in cases in which the load state detected by the state detection section is a high load state, and sets the transmission level higher than the standard level in cases in which the load state is a low load state.

The power feed control device of the second aspect enables the transmission level to be adjusted in consideration of the load state of the power unit.

A power feed control device of a third aspect is the power feed control device of the first aspect or the second aspect, wherein the state detection section detects a travel state of the vehicle as the vehicle state, and the adjustment section raises the transmission level to a standard level in cases in which the travel state is a state corresponding to either decelerating or being stationary and also the transmission level is currently set lower than the standard level, and then sets the transmission level to higher than the standard level after a specific period of time has elapsed from when the transmission level was raised.

The power feed control device of the third aspect enables the transmission level to be adjusted in consideration of the travel state.

A power feed control device of a fourth aspect is the power feed control device of the third aspect, wherein the travel state of a state of decelerating is a state in which deceleration occurs due to regenerative braking.

The power feed control device of the fourth aspect enables the transmission level to be adjusted according to regenerative braking.

A power feed control device of a fifth aspect is the power feed control device of any one of the first aspect to the third aspect, wherein the travel state of a state of decelerating is a state of decelerating from steady travel.

The power feed control device of the fifth aspect enables the transmission level to be adjusted according whether or not there is steady travel.

A power feed control method of a sixth aspect is processing for execution by a computer. The processing includes, in cases in which electrical power supplied from an electric generator provided in a vehicle is converted into microwaves and transmitted, the transmitted microwaves are received, and the microwaves are reconverted into electrical power for accumulation in a battery, detecting a vehicle state related to drive of the vehicle, and adjusting a transmission level of the microwaves for transmission based on the vehicle state.

The power feed control method of the sixth aspect enables wireless power feed to an auxiliary device to be performed while optimizing the efficiency of fuel economy of a vehicle.

A power feed control program of a seventh aspect causes processing to be executed by a computer. The processing includes in cases in which electrical power supplied from an electric generator provided in a vehicle is converted into microwaves and transmitted, the transmitted microwaves are received, and the microwaves are reconverted into electrical power for accumulation in a battery, detecting a vehicle state related to drive of the vehicle, and adjusting a transmission level of the microwaves for transmission based on the vehicle state.

The power feed control program of the seventh aspect enables wireless power feed to an auxiliary device to be performed while optimizing the efficiency of fuel economy of a vehicle.

The technology disclosed herein enables wireless power feed to an auxiliary device to be performed while optimizing the efficiency of fuel economy of a vehicle.

BRIEF DESCRIPTION OF THE DRAWINGS

Exemplary embodiments of the present disclosure will be described in detail based on the following figures, wherein:

FIG. 4 is a flowchart illustrating a flow of power feed control processing executed by a power feed control device of a first exemplary embodiment;

FIG. 5 is a flowchart illustrating a flow of power feed control processing executed by a power feed control device of a second exemplary embodiment; and FIG. 6 is a flowchart illustrating a flow of power feed control processing executed by a power feed control device of a third exemplary embodiment.

DETAILED DESCRIPTION

Figure 1:
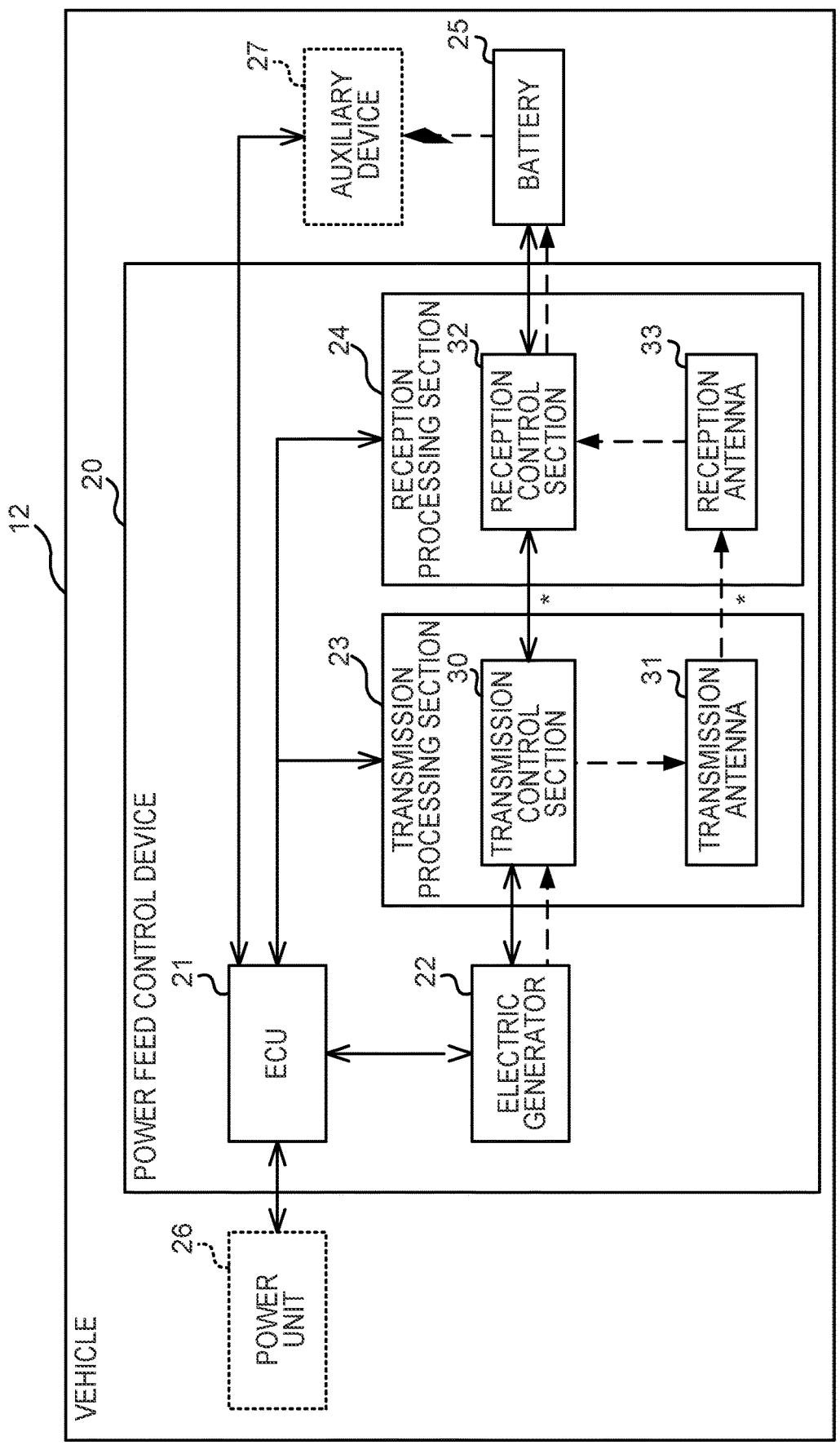
FIG. 1 is a diagram illustrating a schematic configuration of a power feed control device of a vehicle according to an exemplary embodiment.

As illustrated in FIG. 1, a power feed control device 20 of an exemplary embodiment of the present disclosure is provided to a vehicle 12. The power feed control device 20 is configured including an electronic control unit (ECU) 21, an electric generator 22, a transmission processing section 23, and a reception processing section 24. The transmission processing section 23 includes a transmission control section 30 and a transmission antenna 31. The reception processing section 24 includes a reception control section 32 and a reception antenna 33. The ECU 21 is connected to a power unit 26. Note that although in this case the electric generator 22 is inside the power feed control device 20, the electric generator 22 may be external thereto. Moreover, although a battery 25 in this case is external to the power feed control device 20, it may be provided therein.

As illustrated in FIG. 1, in the power feed control device 20 signals are transmitted and received and electrical power is supplied (transmitted by microwaves). The solid lines indicate transmission and reception of signals, and the broken lines indicate electrical power supply. The ECU 21 transmits and receives signals for processing of the electric generator 22, the transmission processing section 23, and the reception processing section 24 by wired transmission. Necessary signals related to electrical power supply are transmitted and received by wire between the electric generator 22 and the transmission processing section 23. The transmission processing section 23 and the reception processing section 24 are physically separated from each other, and wireless transmission and reception of signals and transmission of electrical power by microwaves is performed therebetween. In FIG. 1 asterisks are appended lines of wireless transmission. A signal is transmitted wirelessly from the transmission processing section 23 to the reception processing section 24. Electrical power supply is performed by electrical power being supplied by wire from the electric generator 22 to the transmission processing section 23, and from the reception processing section 24 to the battery 25. Electrical power is supplied by wireless communication between the transmission processing section 23 and the reception processing section 24. Note that the above transmission and reception of signals by wire are merely an example thereof, and may be performed wirelessly.

The ECU 21 is an ECU for detecting a drive state and load state of the power unit 26, such as an engine or drive motor, for detecting a travel state, and for controlling a transmission level. Various sensors (omitted in the drawings) are attached to the ECU 21. The various sensors include a sensor for detecting the drive state of the power unit 26, a sensor for detecting a load state of the power unit 26, a sensor for detecting a travel state of the vehicle 12, and a sensor for detecting driving operations such as braking and steering of the vehicle 12. The travel state is, for example, detected from a vehicle speed, acceleration yaw rate, wheel angle of vehicle wheels, accelerator operation amount, brake pedal pressure, and the like. A hardware configuration and functional configuration of the ECU 21 are described later.

The electric generator 22 is a DCDC converter for power feeding to auxiliary devices 27 of the vehicle 12. Due to the electric generator 22 being provided for power feeding to the auxiliary devices 27, a separate electric generator (omitted in the drawings) is provided for regenerative braking in cases in which the vehicle 12 is a hybrid electric vehicle (HEV) or a battery electric vehicle (BEV). Various devices installed to the vehicle 12 are anticipated for the auxiliary devices 27. Electrical terminals such as smartphones and tablets are anticipated for passenger vehicles. A mobility unit is anticipated for the auxiliary devices 27 for a vehicle is installed with a mobility unit. A mobility unit means a small scale transporter to carry packages and the like loaded to a vehicle.

Description follows regarding each section of the transmission processing section 23. The transmission control section 30 receives electrical power supply from the electric generator 22, and distributes power to the transmission antenna 31. A transmission level set in the transmission control section 30 is maintained. Further details about the transmission level are described later. The transmission antenna 31 converts electrical power into microwaves, and transmits microwaves at the transmission level set in the transmission control section 30 to the reception antenna 33.

Description follows regarding each section of the reception processing section 24. The reception antenna 33 receives microwaves, re-converts the microwaves into electrical power, and supplies the electrical power to the reception control section 32. The reception control section 32 accumulates the supplied electrical power in the battery 25. The battery is connected to the auxiliary devices 27 either by wire or wirelessly, and charges the auxiliary devices 27.

Figure 2:
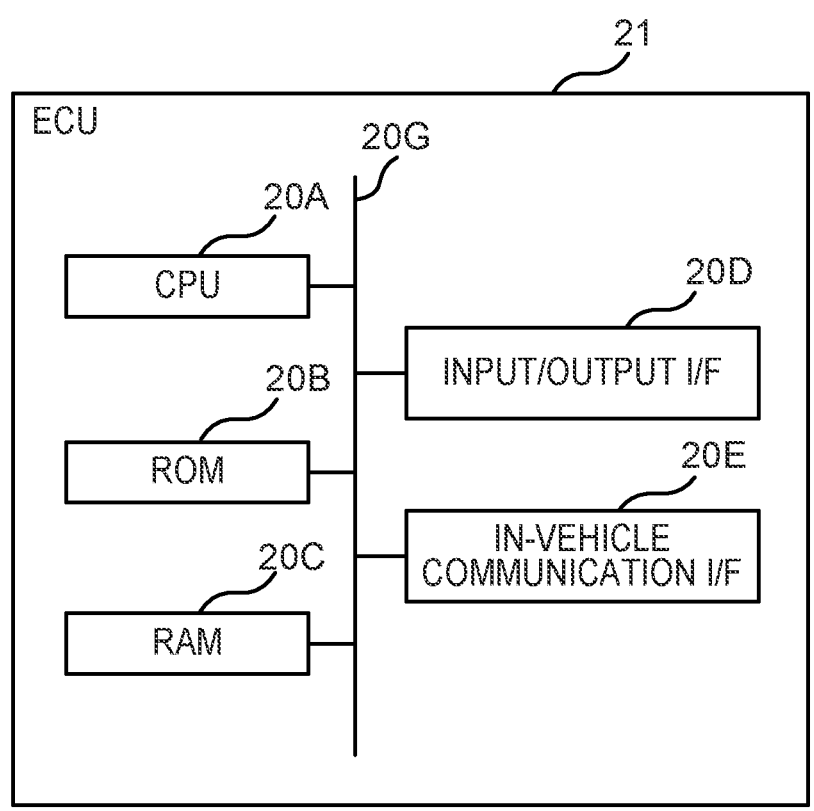
FIG. 2 is a block diagram illustrating a hardware configuration of an ECU of an exemplary embodiment.

FIG. 2 is a block diagram illustrating a hardware configuration of the ECU 21. As illustrated in FIG. 2, the ECU 21 is configured including a central processing unit (CPU) 20A, read only memory (ROM) 20B, random access memory (RAM) 20C, an input/output (interface) I/F 20D, and an in-vehicle communication I/F 20E. The CPU 20A, the ROM the RAM 20C, the input/output I/F 20D, and the in-vehicle communication I/F 20E are connected together through an internal bus 20G so as to be able to communication with each other.

The CPU 20A serves as a processor and is a central processing unit that executes various programs and controls each section. Namely, the CPU 20A reads a program from the ROM 20B, and executes the program using the RAM 20C as workspace.

The ROM 20B is stored with various programs and various data. Note that the ECU 21 may be provided with storage configured by a hard disk drive (HDD) or solid state drive (SSD), either instead of the ROM 20B or in addition to the ROM 20B. The RAM 20C serves as workspace for temporarily storing programs or data.

The input/output I/F 20D is an interface for connecting to the various sensors installed to the vehicle 12.

The in-vehicle communication I/F 20E is an interface for connecting to other ECUs. This interface performs communication using a controller area network (CAN) protocol and Ethernet (registered trademark). The in-vehicle communication I/F 20E is connected to an external bus (omitted in the drawings).

First Exemplary Embodiment

In a first exemplary embodiment, an embodiment will be described for a case in which the vehicle 12 is an HEV having electric and gasoline drive.

Figure 3A:
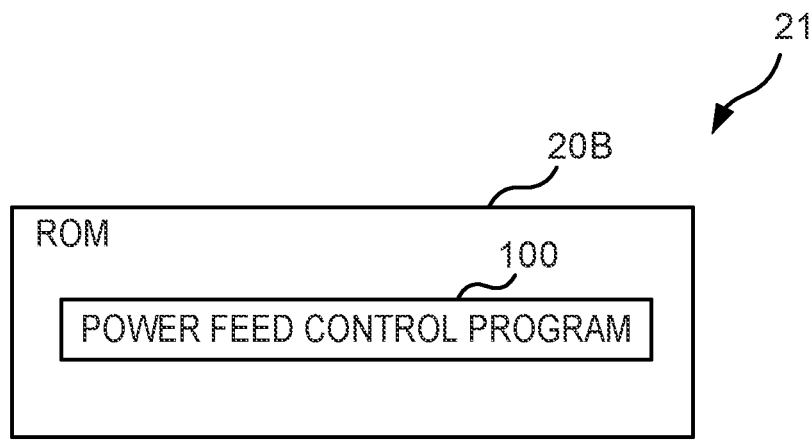
FIG. 3A is a block diagram illustrating a configuration of ROM of an ECU of an exemplary embodiment.

As illustrated in FIG. 3A, the ROM 20B of the ECU 21 is stored with a power feed control program 100. The power feed control program 100 is a program for controlling the ECU 21.

Figure 3B:
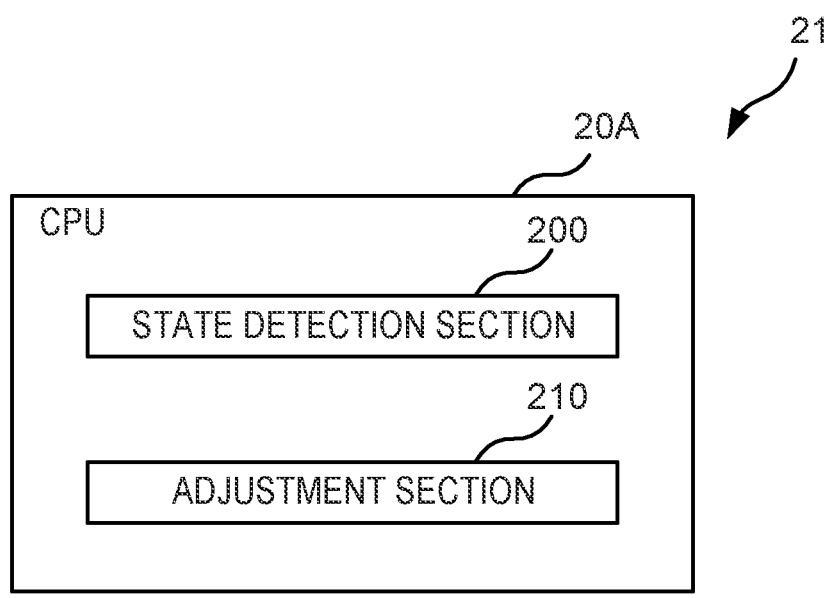
FIG. 3B is a block diagram illustrating a configuration of ROM of an ECU of an exemplary embodiment.

As illustrated in FIG. 3B, in the ECU 21 of the present exemplary embodiment the CPU 20A functions as a state detection section 200 and an adjustment section 210 by executing the power feed control program 100.

The state detection section 200 detects a vehicle state related to drive of the vehicle 12. Examples of the vehicle state related to drive include a drive state of an engine or motor in the power unit 26 of the vehicle 12, a load state of the engine or motor, and a travel state related to decelerating or being stationary. In cases in which the travel state is deceleration then, for example, a state arising from deceleration under regenerative braking in a hybrid vehicle is detected. Moreover, a state of travel related to driving of an engine is detected as the travel state. For example, being in an accelerating travel state or being in a steady travel state is detected as the travel state. An accelerating travel state is a high load state in which the engine is driven with torque. Steady travel is a state of travel at low load in which the engine is driven with hardly any torque. This accordingly enables the detection of a state decelerating from steady travel and a state of being stationary.

The adjustment section 210 adjusts the transmission level of microwaves for transmission by the transmission antenna 31 of the transmission processing section 23 based on the detected vehicle state. The transmission level is an intensity of electromagnetic waves when electrical power has been converted into microwaves for transmission. In the present exemplary embodiment an example will be described of a case in which the transmission level is set to three steps, minimum, standard, and maximum. Note that these three steps are merely an example, and plural steps may be provided from a minimum to a maximum with reference to the standard as a reference. Setting the transmission level lower than the standard setting refers to a low level 1 that is one step lower than the standard setting, a low level 2 that is two steps lower than the standard setting, etc. Setting the transmission level higher than the standard setting refers to a high level 1 that is one step higher than the standard setting, a high level 2 that is two steps higher than the standard setting, etc.

The adjustment section 210 sets the transmission level to the minimum in cases in which the load state of the engine or motor in the power unit 26 is high load. For the load state, a threshold is provided for determining whether or not there is a high load state. In cases in which deceleration has arisen due to regenerative braking in the travel state and the transmission level is not greater than the standard, namely cases in which the minimum transmission level has been set, the adjustment section 210 raises the transmission level to the standard, and then sets the transmission level to the maximum after a specific period of time of being raised. The adjustment section 210 sets the transmission level to standard in cases in which there is no deceleration due to regenerative braking in the travel state. Adopting such an approach in cases in which the minimum transmission level has been set enables emission of noise and a drop in voltage to be suppressed from occurring during conversion of electrical power and transmission of microwaves from the transmission antenna 31, due to the transmission level being raised to the maximum stepwise over time.

Control Flow

Description follows regarding a flow of power feed control processing executed in the power feed control device 20 of the present exemplary embodiment, with reference to the flowchart of FIG. 4. FIG. 4 is a flowchart illustrating a flow of power feed control processing executed by the power feed control device 20 of the first exemplary embodiment. The power feed control processing is executed at startup of wireless power feed. The wireless power feed is, for example, started when the ECU 21 has detected that an auxiliary device has been connected to the battery 25.

At step S100, the CPU 20A initializes the transmission level to standard.

At step S102 the CPU 20A determines whether or not the engine is driving based on the drive state of the engine. Processing transitions to step S104 when determined that the engine is driving, and processing transitions to step S110 when determined that the engine is not driving.

At step S104, the CPU 20A determines whether or not there is a high load based on the load state of the engine. Processing transitions to step S106 when determined that there is a high load, and processing transitions to step S108 when determined that there not a high load.

At step S106, the CPU 20A sets the transmission level of the transmission control section 30 to minimum (or a transmission level lower than standard level). Processing then transitions to step S122. When the transmission level has been set in the transmission control section 30, microwaves are transmitted to the reception antenna 33 by the transmission antenna 31 at the set transmission level. This is also similar for when the following settings are made. The present step is an example of a case in which there is a high load state.

At step S108, the CPU 20A sets the transmission level of the transmission control section 30 to standard.

At step S110, the CPU 20A determines whether or not a deceleration has occurred due to regenerative braking in a travel state. Processing transitions to step S112 when determined that deceleration due to regenerative braking has occurred. Processing transitions to step S120 when determined that deceleration due to regenerative braking has not occurred.

At step S112, the CPU 20A determines whether or not the transmission level currently set is the minimum (or a transmission level lower than standard level). Processing transitions to step S114 when determined that the minimum transmission level is set, and processing transitions to step S118 when determined that the minimum transmission level is not set.

At step S114, the CPU 20A raises the transmission level and sets to standard.

At step S116, the CPU 20A determines whether or not a specific period of time has elapsed, processing transitions to step S118 in cases in which the specific period of time has elapsed, and the present step is repeated in cases in which the specific period of time has not elapsed. The specific period of time may, for example, be appropriately determined from a noise effect with respect to elapsed time or the like.

At step S118, the CPU 20A sets the transmission level to maximum (or to a transmission level higher than the standard). Processing then transitions to step S122. The present step is an example of a case in which there is a low load state.

At step S120, the CPU 20A sets the transmission level to standard. Processing then transitions to step S122.

At step S122, the CPU 20A determines whether or not to stop wireless power feed. This determination is, for example, made according to a charging state of the auxiliary device 27, and determination to stop may be made in cases in which charging of the auxiliary device 27 is complete, and in cases in which the auxiliary device 27 has been disconnected from the battery 25. Processing is ended when determined to stop the wireless power feed, and processing repeatedly returns to step S102 when not to stop the wireless power feed is determined.

The power feed control device 20 of the present exemplary embodiment is thereby able to perform wireless power feed to the auxiliary device while optimizing the efficiency of fuel economy in an HEV.

Second Exemplary Embodiment

In a second exemplary embodiment, an example will be described of a case in which the vehicle 12 is an electrically driven BEV. A configuration of the power feed control device 20 of the second exemplary embodiment is similar to that of the first exemplary embodiment, and so description will focus on processing different to that of the first exemplary embodiment. FIG. 5 is flowchart illustrating a flow of power feed control processing executed by the power feed control device 20 of the second exemplary embodiment.

At step S102-2, the CPU 20A determines whether or not the motor is under a high load based on the load state of the motor. Processing transitions to step S106 when a high load is determined, and processing transitions to step S110 when a high load is not determined. Other processing is similar to that of the first exemplary embodiment.

Thus the power feed control device 20 of the present exemplary embodiment is thereby is able to perform wireless power feed to an auxiliary device while optimizing the efficiency of fuel economy in a BEV vehicle.

Third Exemplary Embodiment

In the third exemplary embodiment, description follows regarding an embodiment for a case in which the vehicle 12 is a conventional vehicle with a gasoline drive. A configuration of the power feed control device 20 of the third exemplary embodiment is similar to that of the first exemplary embodiment, and so description will focus on parts of processing different to that of the first exemplary embodiment. FIG. 6 is a flowchart illustrating a flow of power feed control processing executed by the power feed control device of the third exemplary embodiment.

At step S102-3, the CPU 20A determines whether or not there is accelerated travel based on the travel state. Processing transitions to step S106 when determined that there is accelerated travel, and processing transitions to step S110-3 in cases in which determination is that there is not accelerated travel.

At step S110-3, the CPU 20A determines whether or not the travel state is steady travel. Processing transitions to step S112 when determined not to be steady travel. Processing transitions to step S120 when steady travel is determined. Other processing is similar to that of the first exemplary embodiment.

Thus the power feed control device 20 of the present exemplary embodiment is thereby able to perform wireless power feed to an auxiliary device while optimizing the efficiency of fuel economy in a conventional vehicle.

Note that each type of processing executed in the above exemplary embodiments by the CPU 20A reading in software (a program) may be executed by various processors other than a CPU. In such cases, such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Each of the above processing may be executed by any one of these various types of processor, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

In each of the above exemplary embodiments, embodiments were described in which each of the programs is pre-stored (installed) on a computer readable non-transitory recording medium. For example, the power feed control program 100 in the integration ECU 21 was pre-stored in the ROM 20B of the ECU 21. However, there is no limitation thereto, and each of the programs may be provided in a format recorded on a non-transitory recording medium such as a compact disc read only memory (CD-ROM), digital versatile disc read only memory (DVD-ROM), universal serial bus (USB) memory, or the like. Moreover, the program may be provided in a format downloadable from an external device over a network.

The flow of processing described for each of the above exemplary embodiments is merely an example thereof, and redundant steps may be omitted, new steps may be added, and the processing sequence may be swapped around within a range not departing from the spirit of the present disclosure.

What is claimed is:

1. A power feed control device, comprising a processor, a transmission processing section, and a reception processing section, wherein:
the transmission processing section configured to convert electrical power, supplied from an electric generator provided in a vehicle, into microwaves and to transmit the microwaves;

the reception processing section configured to receive the microwaves that have been transmitted and to reconvert the microwaves into electrical power for accumulation in a battery;

the processor is configured to detect a vehicle state related to drive of the vehicle; and adjust a transmission level of the microwaves for transmission based on the vehicle state;

wherein:

when the vehicle is a hybrid vehicle or a BEV,
   the vehicle state includes a load state of a power unit and a travel state of the vehicle,
   the processor detects, as the travel state, a state of deceleration by regenerative braking or a stopped state,
   the processor sets the transmission level lower than a standard level when the load state is a high load state, and
   when the travel state corresponds to either the deceleration by regenerative braking or the stopped state and the transmission level has been set lower than the standard level, the transmission level is raised to the standard level, and the transmission level is further set higher than the standard level after a predetermined time has passed from the raising; and when the vehicle is a conventional vehicle,
   the vehicle state includes the travel state of the vehicle,
   the processor detects, as the travel state, an acceleration state or a steady travel state,
   when the travel state is the acceleration state, the transmission level is set lower than the standard level, and when the travel state corresponds to either a deceleration from the steady travel or a stopped state and the transmission level has been set lower than the standard level, the transmission level is raised to the standard level, and is further set higher than the standard level after a specific period of time has elapsed from the raising.

2. A power feed control method of processing for execution by a computer, the processing comprising:
   when electrical power supplied from an electric generator provided in a vehicle is converted into microwaves and transmitted, the transmitted microwaves are received, and the microwaves are reconverted into electrical power for accumulation in a battery,
   detecting a vehicle state related to drive of the vehicle; and
   adjusting a transmission level of the microwaves for transmission based on the vehicle state;
   wherein:
   when the vehicle is a hybrid vehicle or a BEV,
      the vehicle state includes a load state of a power unit and a travel state of the vehicle,
      a state of deceleration by regenerative braking or a stopped state is detected as the travel state,
      the transmission level is set lower than a standard level when the load state is a high load state, and
      when the travel state corresponds to either the deceleration by regenerative braking or the stopped state and the transmission level has been set lower than the standard level, the transmission level is raised to the standard level, and the transmission level is further set higher than the standard level after a predetermined time has passed from the raising; and
   when the vehicle is a conventional vehicle,
      the vehicle state includes the travel state of the vehicle,
      an acceleration state or a steady travel state is detected as the travel state,
      when the travel state is the acceleration state, the transmission level is set lower than the standard level, and when the travel state corresponds to either a deceleration from the steady travel or a stopped state and the transmission level has been set lower than the standard level, the transmission level is raised to the standard level, and is further set higher than the standard level after a specific period of time has elapsed from the raising.

3. A non-transitory computer readable storage medium storing a power feed control program executable by a computer to perform processing, the processing comprising:
   when electrical power supplied from an electric generator provided in a vehicle is converted into microwaves and transmitted, the transmitted microwaves are received, and the microwaves are reconverted into electrical power for accumulation in a battery,
   detecting a vehicle state related to drive of the vehicle; and
   adjusting a transmission level of the microwaves for transmission based on the vehicle state;
   wherein:
   when the vehicle is a hybrid vehicle or a BEV,
      the vehicle state includes a load state of a power unit and a travel state of the vehicle,
      a state of deceleration by regenerative braking or a stopped state is detected as the travel state,
      the transmission level is set lower than a standard level when the load state is a high load state, and
      when the travel state corresponds to either the deceleration by regenerative braking or the stopped state and the transmission level has been set lower than the standard level, the transmission level is raised to the standard level, and the transmission level is further set higher than the standard level after a predetermined time has passed from the raising; and
   when the vehicle is a conventional vehicle,
      the vehicle state includes the travel state of the vehicle,
      an acceleration state or a steady travel state is detected as the travel state,
      when the travel state is the acceleration state, the transmission level is set lower than the standard level, and when the travel state corresponds to either a deceleration from the steady travel or a stopped state and the transmission level has been set lower than the standard level, the transmission level is raised to the standard level, and is further set higher than the standard level after a specific period of time has elapsed from the raising.

* * * * *